Dec. 9, 1941.   C. H. WIDMAN ET AL   2,265,560
VEHICLE BODY
Original Filed Aug. 7, 1935   5 Sheets-Sheet 1
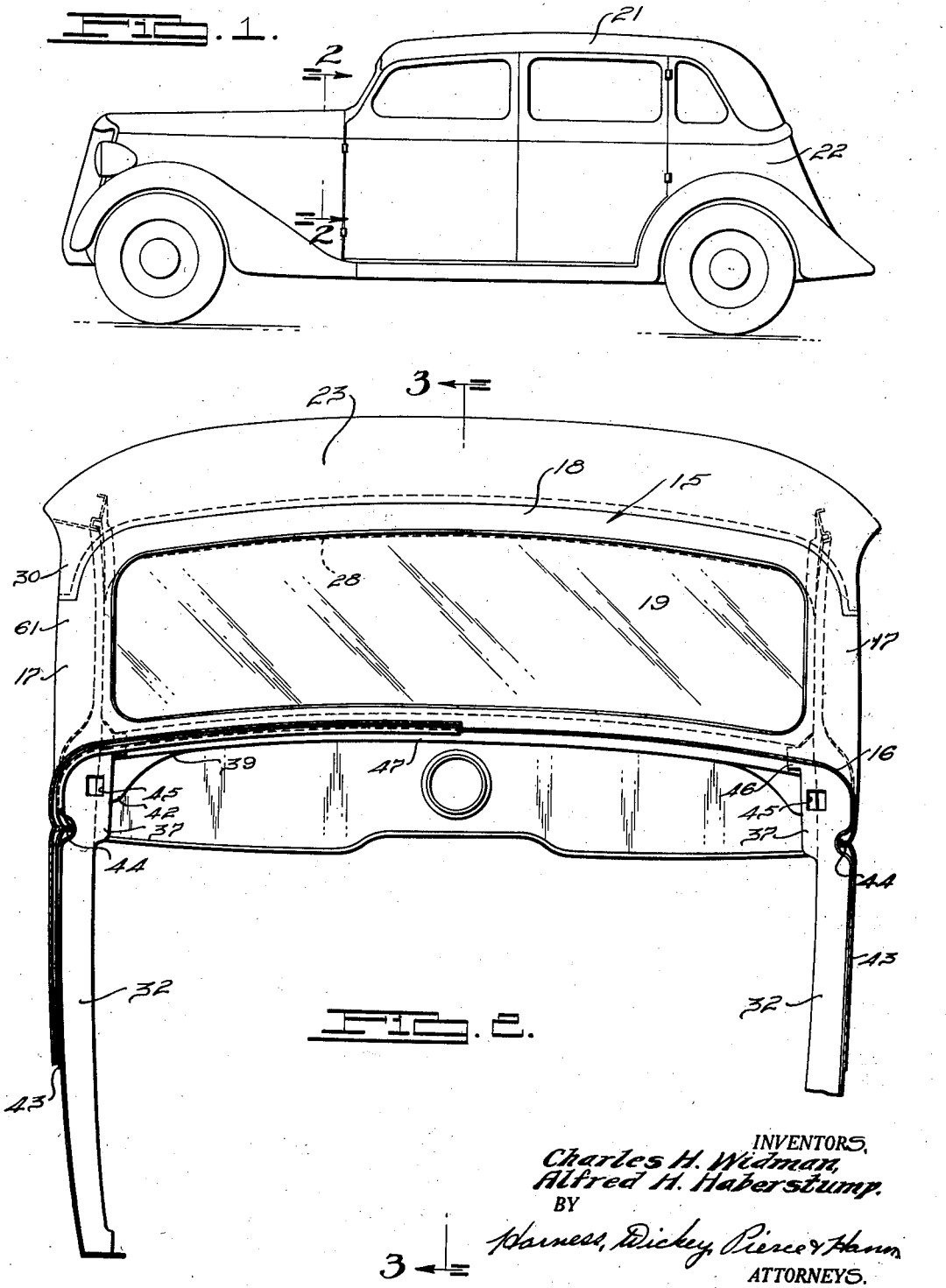
INVENTORS,
Charles H. Widman,
Alfred H. Haberstump.
BY
Harness, Dickey, Pierce & Hann
ATTORNEYS.

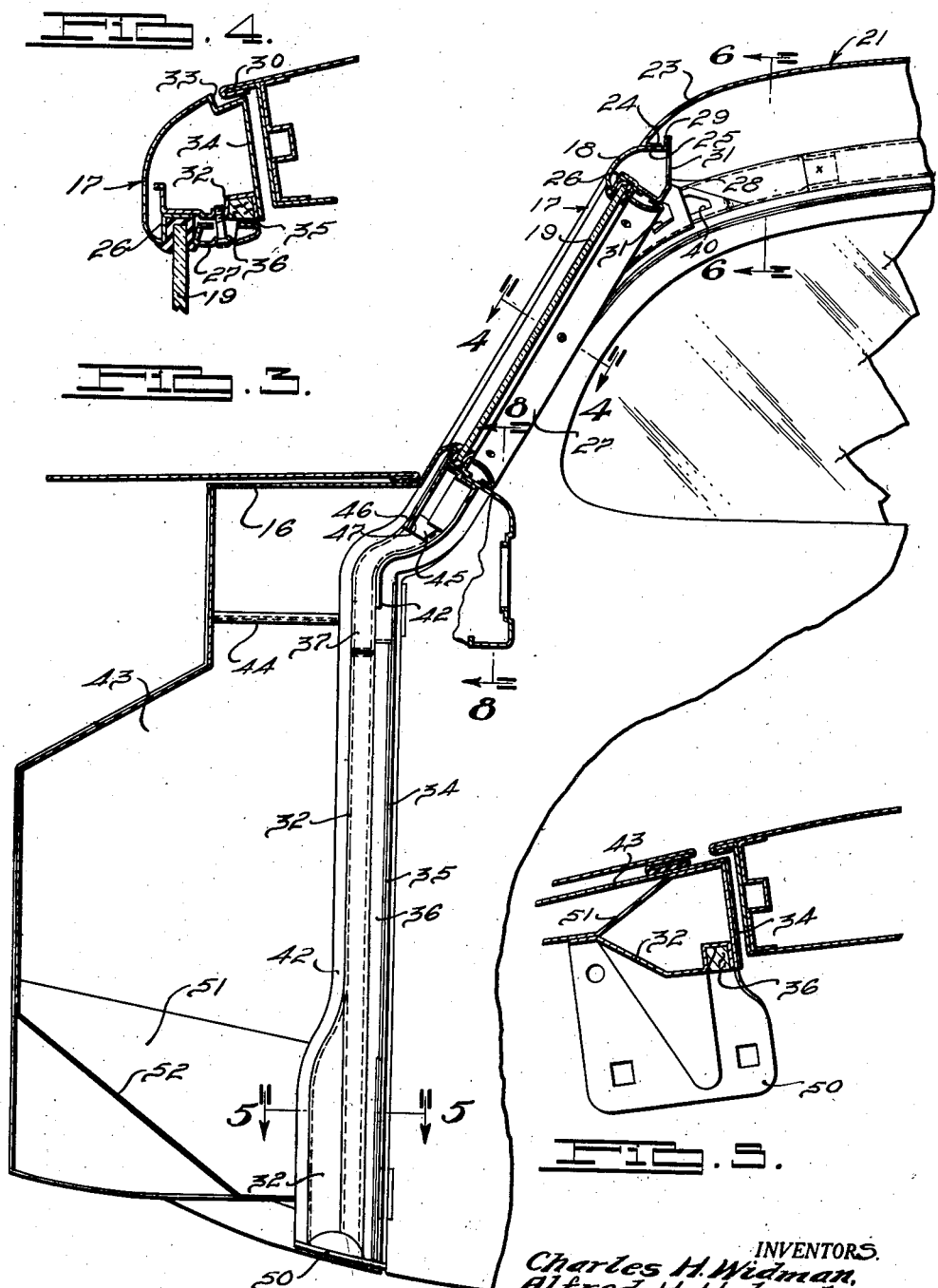

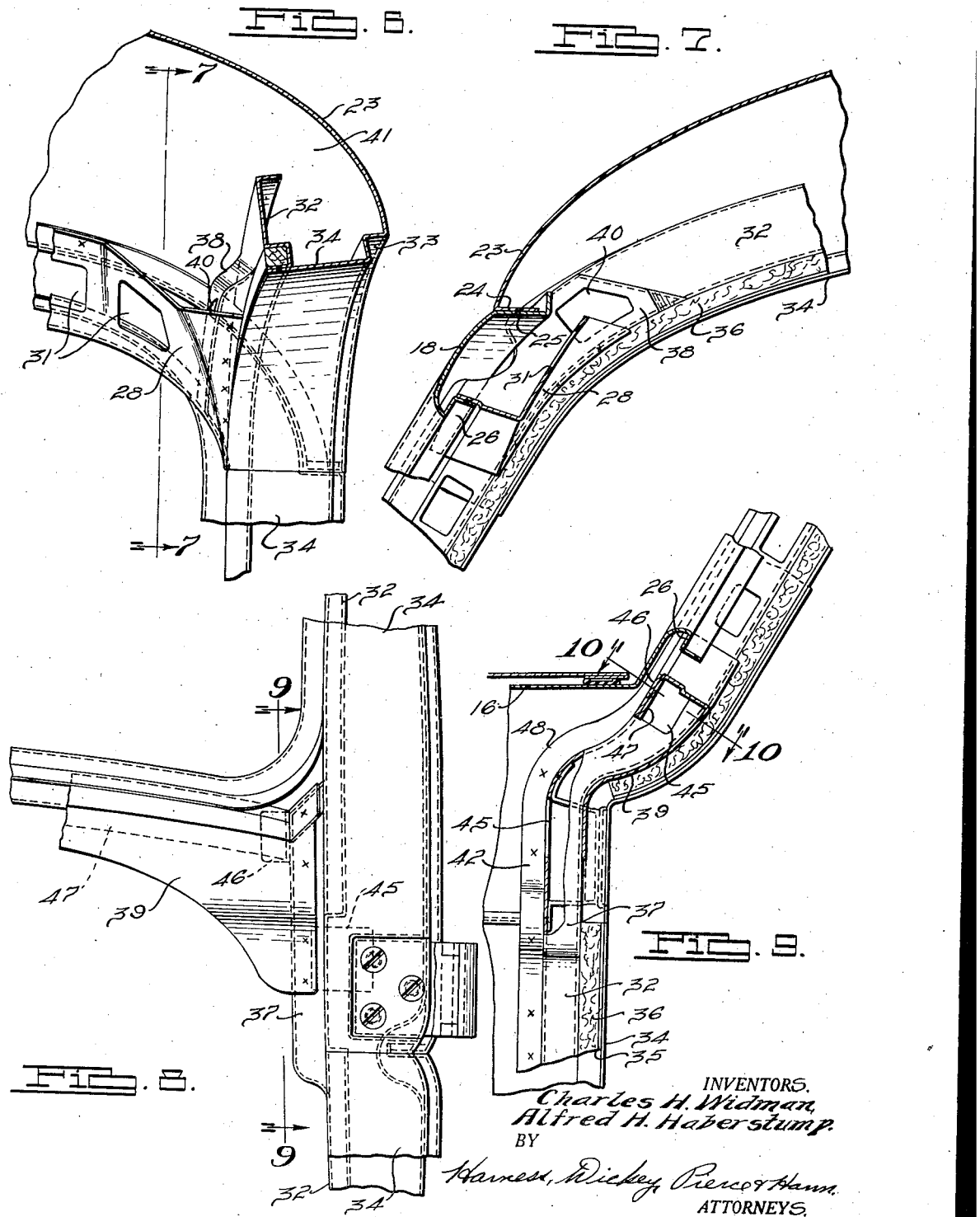

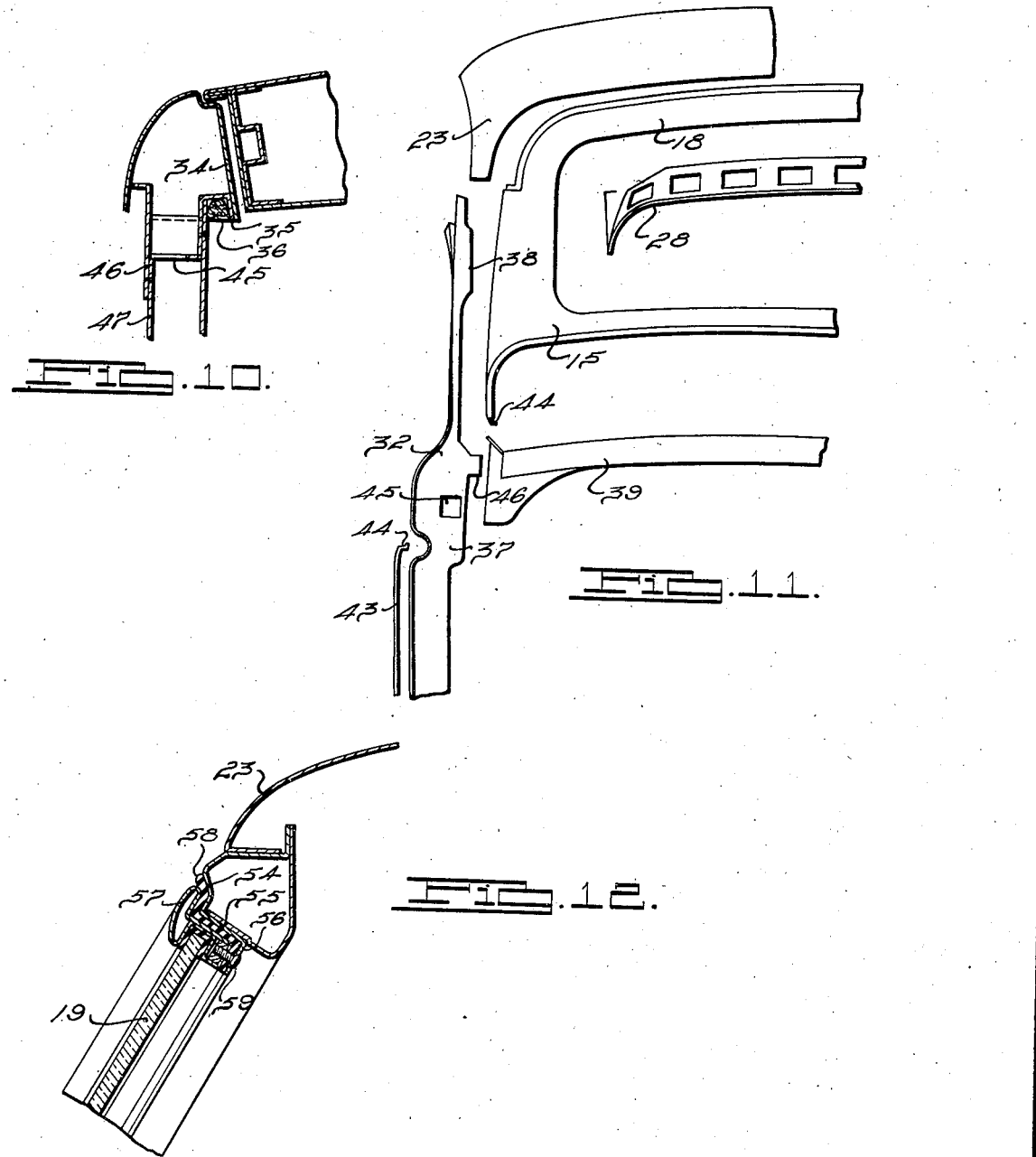

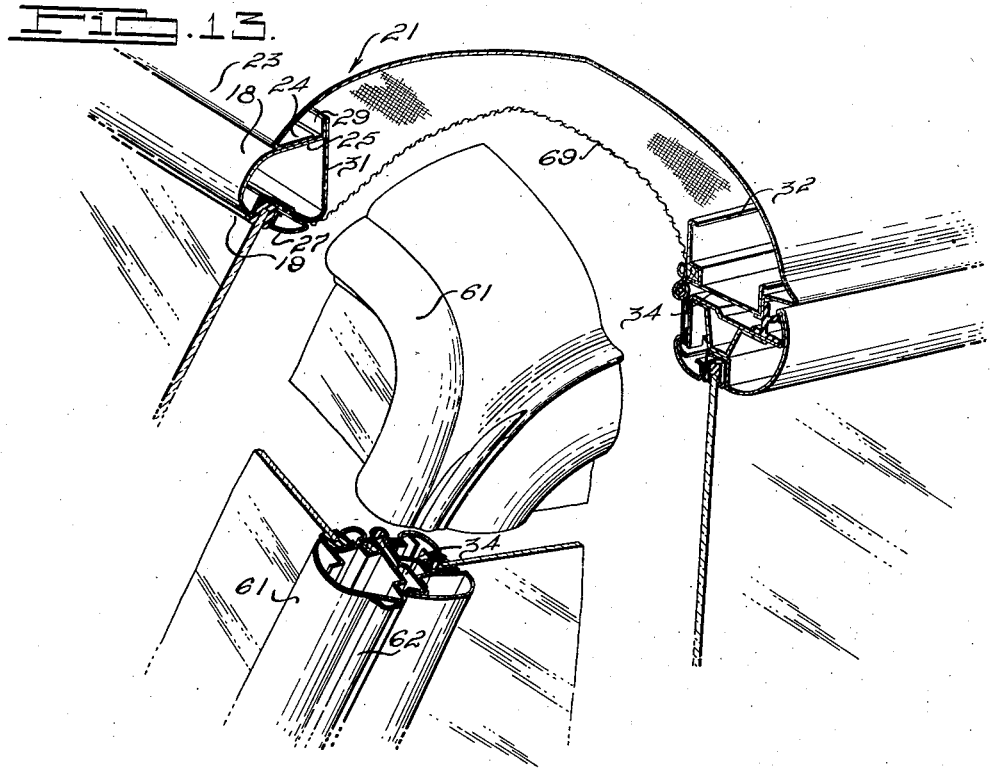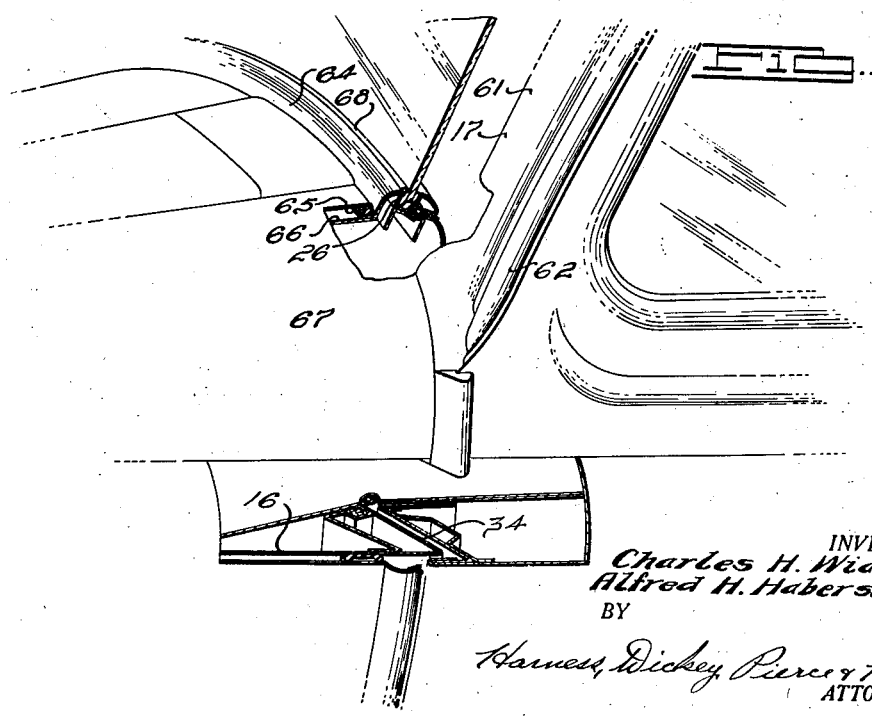

Patented Dec. 9, 1941

2,265,560

UNITED STATES PATENT OFFICE 2,265,560

VEHICLE BODY

Charles H. Widman and Alfred H. Haberstump, Detroit, Mich.

Application August 7, 1935, Serial No. 35,049
Renewed February 18, 1939

4 Claims. (Cl. 296—28)

Our invention relates to vehicle bodies and particularly to the front end construction thereof embodying the cowl and roof panel.

Difficulty has always been experienced when welding various preformed panels together when their edges are abutted to form a body for an automobile. This is especially true today in view of the material curvature of the panels employed in the present automobile bodies. The present invention is considered a material advancement in the art when eliminating the welding of abutted panels. It has always been difficult to weld thin sheets when in abutted relation, even when flat, and retain the surfaces in exact alignment. In view of the curvature of the panels which are now employed in body constructions, it is substantially impossible to accurately align the surfaces. As a result, material labor is required to dress the surfaces to smooth alignment and often times the scrapping of the large assembled panels is necessary. The dressing of the panels, because of the misalignment of the surfaces, materially weakens the construction since weak joints will thereby result.

In practicing our present invention, we construct the panels in such a manner that they may be welded or otherwise secured together, without the edges being in abutted relation. We have materially strengthened rather than weakened the joints by providing flanges in angular relation to the panels which are secured together. While any known welding operation may be employed, it is to be understood that rivets, bolts, or other securing means may also be utilized to effect a simple assembly operation.

Heretofore the assembly of the panels was made at the body or automobile plants because of the large machine required to retain the panels supported between electrodes which effected the welding of the abutted edges. With the present construction the panels may be shipped to any point where they may be assembled and secured together by a simple welding, riveting, bolting or similar operation.

Accordingly, the main objects of our invention are: to provide cowl and roof panels which are secured together to provide material strength to the construction; to provide a cowl section embodying pillars and a top windshield frame to which the roof panel is secured by welding; to flange the marginal edge of the top frame portion of the windshield opening and secure the flange to the flange of the roof panel and to the reinforcing header of the section; to provide a roof panel which slopes to mate with the top frame element of the windshield opening and secured together by engaging flanges; to secure the flange of the cowl section and the flange of the roof panel together by welding, riveting, bolting or similar operation; to provide reinforcing elements for the pillars of the cowl section which forms a box section therewith; to provide the pillar reinforcing elements with extending portions above and below the windshield opening to permit the spot welding riveting, bolting, or like securing, of header and cowl bars thereto; to secure the reinforcing pillar element to the cowl panel and after such assembly to secure header and cowl crossbars in rigid relation to the element; to provide an outwardly presented channel at the edge of the reinforcing pillar elements to permit the welding of the section to the paneling and provide a recess in which a tacking element may be secured; and, in general, to provide a front end and roof panel for a vehicle body which is simple in construction, economical of manufacture and which may be readily assembled.

Other objects and features of novelty of our invention will be either specifically pointed out or will become apparent when referring, for a better understanding of our invention, to the following description taken in conjunction with the accompanying drawings, wherein:

Figure 1 is a view in elevation of an automobile having a body thereon constructed in accordance with our invention;

Fig. 2 is an enlarged sectional view of the structure illustrated in Fig. 1, taken on the line 2—2 thereof;

Fig. 3 is a sectional view of the structure illustrated in Fig. 2, taken on the line 3—3 thereof;

Fig. 4 is an enlarged sectional view of the structure illustrated in Fig. 3, taken on the line 4—4 thereof;

Fig. 5 is an enlarged sectional view of the structure illustrated in Fig. 3, taken on the line 5—5 thereof;

Fig. 6 is an enlarged sectional view of the structure illustrated in Fig. 3, taken on the line 6—6 thereof;

Fig. 7 is a sectional view of the structure illustrated in Fig. 6, taken on the line 7—7 thereof;

Fig. 8 is an enlarged sectional view of the structure illustrated in Fig. 3, taken on the line 8—8 thereof;

Fig. 9 is a sectional view of the structure illustrated in Fig. 8, taken on the line 9—9 thereof;

Fig. 10 is a sectional view of the structure illustrated in Fig. 9, taken on the line 10—10 thereof;

Fig. 11 is a broken exploded view of the front body section illustrated in the foregoing figures;

Fig. 12 is a view of structure, similar to that illustrated in Fig. 3, showing a modified form thereof;

Fig. 13 is a perspective view of the pillar and top corner of the assembled structure showing various sections thereof, and Fig. 14 is a perspective view of the pillar and cowl structure, showing various sections of the assembled elements.

The body illustrated in Fig. 1, has the cowl portion illustrated in section in Fig. 2 to show the unique front end construction. A unit panel 15 is preformed to embody a cowl portion 16, pillars 17 and a top windshield frame element 18, the pillars, frame element and the cowl forming an opening 19 for the windshield. The windshield may be mounted for tilting movement within the frame, but is preferably sealed therein by a rubber or other sealing element.

The rear portion of the body comprises a roof panel 21, a rear panel 22, which are secured together in various manners as disclosed in the copending applications of C. H. Widman, et al., Serial No. 32,217, filed July 17, 1935, and C. H. Widman, et al., Serial No. 35,050, filed August 7, 1935, which are assigned to the assignee of the present application. The front edge 23 of the roof panel 21 is arcuately shaped laterally to mate with the arcuate shape of the windshield frame 18. The roof is curved frontwardly as illustrated in Fig. 3, and is reversely flanged at 24 to mate with the flange 25 on the windshield frame 18. In this manner a joint is effected between the roof panel and the cowl section which may be welded, riveted, bolted, or otherwise secured, thereby eliminating the welding of abutted edges, which was extremely expensive and produced weak joints. The present joint has material strength since the secured flanges are disposed at an angle to the panels.

The roof extends laterally and downwardly at the corners to mate in flush relation with the top edge of the pillars 17 to be joined thereto by mating flanges 24 and 25 which extend along the top edge of the pillar and along the edge of the roof panel and the windshield frame element 18. The panel about the window opening 19 has its inner edge reversely bent and disposed at an angle at 26 to provide a side and bottom of a glass retaining rabbet. An inner finish frame 27 is employed for retaining the windshield in position.

A header bar 28 extends across the top of the body and is secured to a projecting flange 29 on the flange 25 of the windshield frame 18 and is also secured to the bottom of the rabbet portion 26 of the top frame element 18. A box section structure is provided in this manner which has openings 31 therein through which one element of the spot welding device may be inserted to effect the welding of the flanges 24 and 25. The box section construction adds material strength to the header and forms an exceptionally strong support for the roof panel which further strengthens the assembly. The cowl panel forming the pillars 17 is rabbeted at 33 to receive a flange 30 of the door and is inwardly extended at 34 to form a jamb face. The cowl panel is supported on pillar reinforcing elements 32, which joins the bottom flange of the rabbet portion 26 and the inner surface of the extension 34 of the panel to form a box section therewith. An outwardly presented channel portion 35 is formed on the reinforcing element 32 in which a tacking element 36 may be disposed to retain the tacks of the trim material. The bottom of the element 32 is flanged inwardly of the body to form a brace 50 which is secured to the floor and also to the chassis frame by bolts which extend through the holes therein. At 48 the element is bent at an angle to follow the slope of the windshield pillars. The reinforcing elements 32 have the web portion extended outwardly at 37 below the window opening and at 38 above the window opening. The extensions at 38 are provided to engage and support the header bar 28 which is secured directly to the reinforcing elements by a spot welding, riveting, bolting, or similar operation. A cowl bar 39 is disposed below the window opening secured to the projections 37 on the pillar reinforcing element 32 in the same manner.

The space 41 between the roof 23 and the upper portion of the reinforcing element 32 as illustrated in Fig. 6, is available to have an electrode of a welding gun projected therebetween to effect the welding of the header bar 28 to the extensions 38.

At the cowl section, the flange 42 on the reinforcing element 32 as illustrated in Figs. 2 and 9, is extended to the side of the cowl 16 and to the side cowl panel 43, the latter being secured to the cowl by inwardly projecting flanges 44 provided therein, as illustrated in Fig. 2.

The reinforcing element 32 near the bottom is extended to mate with an element 51 which is spaced from the side of the cowl section 43 and projected laterally at 52 to form the toe board of the body or a support therefor. The flange of the extension 37 is provided with an opening 45 illustrated in Fig. 2, to permit one end of the welding gun to project therethrough to engage the inner surface of the extensions 37 to facilitate the spot welding of the ends of the cowl bar 39 thereto. In Figs. 9 and 10 it will be noted that a similar hole 45 is provided in the side extending face of the projection 37, the tab 46 pressed out therefrom being welded to a downwardly projecting flange 47 on the cowl bar. This, and other holes provided throughout the structure permits the insertion of an electrode of the welding tool while the projecting tab 46 adds additional strength to the construction.

It will be noted in Figs. 6 and 7, that the jamb face 34 of the cowl section and the similar face of the roof portion 23 mate to form a smooth surface. The jamb face 34 on the cowl section is offset to receive the thickness of the material of the jamb face on the roof panel to provide a smooth surface at the point 40 when welded together.

In Fig. 11 the cowl section is shown in exploded relation. The cowl panel 15 may first be assembled on the pillar elements 32 and thereafter the header bar 28 and the cowl bar 39 may be secured to the extended webs 38 and 37, respectively, of the pillar elements. The cowl side sections 43 are secured to the cowl panel by means of the flanges 44 after which the roof panel 23 may be mated with the assembled cowl section and secured thereto as above outlined.

In Fig. 12, we have illustrated a modified form of windshield opening in the cowl panel 15 which is so disposed as to permit the insertion of the windshield from the outside of the body. A rabbet 54 is provided in the preformed portion of the window opening in the pillars, cowl and top frame which is flanged inwardly at 55 and bent in the plane of the windshield at 56. The windshield is provided with a frame 57 which engages a rubber sealing strip 58 disposed between the frame and the rabbet 54 and the flange 55. Suitable screws 59 may be utilized for retaining the windshield drawn against the sealing strip 58 to seal the joint against the entrance of rain and wind. The remainder of the construction follows that above set forth relative to the foregoing figures.

In Figs. 13 and 14 we have shown a front pillar, cowl and roof portion broken to disclose the sections of the assembled structure. The box section formed at the header, the pillar and the cowl panels are clearly disclosed. The upwardly extended flange 29 on the frame element 18 prevents the entrance of moisture into the body should the joint between the flanges 24 and 25 leak. The arcuate projecting portion 61 of the frame 18 blends into the pillars, and the joints 61 between the outer edges of the pillars and the extended portions 30 of the roof panel 21 are illustrated as being hidden by a molding finish strip 62. This joint could also be finished smooth in the conventional manner and the molding strip eliminated.

The cowl in Fig. 14 has the windshield ledge 64 terminating below the windshield opening and flanged at 65 to be secured to the cowl panel 66 hidden by the hood 67. The hood is disposed adjacent to the windshield ledge 64 and no portion of the cowl is visible therebetween. The windshield is retained in the opening by a frame 27 which bears against a rubber sealing strip 68 disposed about the edge of the windshield. Trim material 69 is supported under the roof panel 21 in the conventional manner having its edge at the front secured between the header bar 31 and the frame 27. At the sides the material is tacked to the tacking strip 36 in the side roof rail 32.

The material is preferably coped at the rear side and header panels to curve from the top to the sides of the body to form arcuate curves.

The panels are formed to mate with each other in such a manner as to be secured together by any known welding method, or by bolting, riveting, or similar operation. The inturned flanges which are mated together to effect the securement of the panels together provide material strength to the construction. By so constructing the panels as to eliminate the welding of abutted edges as heretofore employed, the assembly of the various panels may take place remote from the plant in which the stampings are formed and a material saving in shipping costs is thereby effected.

While we have described and illustrated but two embodiments of our invention, it will be apparent to those skilled in the art that various changes, omissions, additions and substitutions may be made therein without departing from the spirit and scope of our invention, as set forth in the accompanying claims.

We claim as our invention:

1. A fabricated vehicle body including, in combination, a front section embodying a cowl panel, pillars and a top frame defining a windshield opening, reinforcing pillar elements extending along the side of the section, said elements being preformed to provide inwardly extending projections at the top and at the bottom of the windshield opening, a header and a brace disposed at the top and bottom of the windshield opening, respectively, and secured to said inwardly preformed projections of the elements, roof rails secured to the upper edge of said elements, and a roof panel extending over said rails and header and provided with a flange which mates with the flange of said section.

2. The combination with a vehicle body including a front section, having a window opening defined by a cowl, pillars and a top frame, the top frame extending inwardly from the terminal top edge of the pillars, and a roof panel having the contour of the top frame and provided with projecting pillar portions which extend downwardly below the top edge of said window opening which engage the top edge of the pillar about the frame to form a unit construction, said frame, the top edge of the pillars and the edge of the mating portion of the roof panel being flanged and secured together by said flanges.

3. In a front end construction for a vehicle body, a windshield framing finish panel extending completely around and defining a windshield opening, said windshield framing panel having an arcuately curved top marginal edge provided with a rearwardly projecting flange, a top panel having a rearwardly projecting flange on the forward marginal edge thereof and adapted to mate with the flange at the top of said windshield opening and provided with projecting pillar portions extending downwardly at the sides of the windshield opening, pillar members extending upwardly at the sides of said windshield opening adapted to mate with said windshield framing panel and with the outboard side of said projecting pillar portions of said top panel, said members being secured together through said mating flanges to provide a unitary construction.

4. The combination with a vehicle body including a front section having a windshield opening defined by a cowl, pillars, and a top frame of hollow box section formation formed to provide a vertically extending flange, and a roof panel having the front ends flanged rearwardly with the flange resting on the top surface of the box section top frame outwardly of the vertically projecting flange thereof.

CHARLES H. WIDMAN.
ALFRED H. HABERSTUMP.

CERTIFICATE OF CORRECTION.

Patent No. 2,265,560. December 9, 1941.

CHARLES H. WIDMAN, ET AL.

It is hereby certified that error appears in the printed specification of the above numbered patent requiring correction as follows: Page 3, second column, line 9, before the word "brace" insert --cowl--; and that the said Letters Patent should be read with this correction therein that the same may conform to the record of the case in the Patent Office.

Signed and sealed this 3rd day of March, A. D. 1942.

(Seal)
Henry Van Arsdale,
Acting Commissioner of Patents.